United States Patent
Ahn

(10) Patent No.: US 12,479,100 B2
(45) Date of Patent: Nov. 25, 2025

(54) MOVING ROBOT AND MOVING ROBOT ASSEMBLY INCLUDING THE SAME

(71) Applicant: HL Robotics Co., Ltd., Seongnam (KR)

(72) Inventor: Jaewan Ahn, Seoul (KR)

(73) Assignee: HL Robotics Co., Ltd., Seongnam (KR)

( * ) Notice: Subject to any disclaimer, the term of this patent is extended or adjusted under 35 U.S.C. 154(b) by 207 days.

(21) Appl. No.: 18/111,943

(22) Filed: Feb. 21, 2023

(65) Prior Publication Data

US 2023/0264354 A1   Aug. 24, 2023

(30) Foreign Application Priority Data

Feb. 22, 2022   (KR) .......................... 10-2022-0023162

(51) Int. Cl.
| | |
|---|---|
| B25J 9/16 | (2006.01) |
| B25J 5/00 | (2006.01) |
| B25J 9/00 | (2006.01) |
| B25J 11/00 | (2006.01) |
| B25J 13/08 | (2006.01) |

(52) U.S. Cl.
CPC ............. B25J 9/1669 (2013.01); B25J 5/007 (2013.01); B25J 9/0096 (2013.01); B25J 9/1674 (2013.01); B25J 9/1679 (2013.01); B25J 11/0005 (2013.01); B25J 13/087 (2013.01)

(58) Field of Classification Search
CPC ...... B25J 9/1669; B25J 9/0096; B25J 9/1674; B25J 9/1679; B25J 9/1664; B25J 9/08; B25J 5/007; B25J 11/0005; B25J 11/002; B25J 13/087; G05D 1/021
USPC .......................... 700/253; 901/1; 701/23, 26; 296/193.03, 193.04
See application file for complete search history.

(56) References Cited

U.S. PATENT DOCUMENTS

| | | | |
|---|---|---|---|
| 5,720,077 A * | 2/1998 | Nakamura | A47L 11/4061 |
| 2007/0061043 A1* | 3/2007 | Ermakov | G05D 1/0274 |
| 2011/0202175 A1* | 8/2011 | Romanov | B25J 13/08 |
| 2013/0345875 A1* | 12/2013 | Brooks | B25J 9/1671 |
| 2016/0334801 A1* | 11/2016 | Ratanaphanyarat | B25J 5/007 |
| 2020/0298394 A1* | 9/2020 | Han | G10L 15/22 |
| 2021/0213604 A1* | 7/2021 | Lee | B25J 9/08 |
| 2021/0272434 A1* | 9/2021 | Hashimoto | G06V 20/10 |
| 2022/0289323 A1* | 9/2022 | Akin | B25J 5/005 |

FOREIGN PATENT DOCUMENTS

CN   213782709 U  *  7/2021

* cited by examiner

*Primary Examiner* — Ramon A. Mercado
*Assistant Examiner* — Ellis B. Ramirez
(74) *Attorney, Agent, or Firm* — Harvest IP Law, LLP

(57) ABSTRACT

A moving robot includes: a connection unit configured to detachably mount one of a plurality of task modules and electrically connectable to the one of a plurality of task modules when the one of a plurality of task modules is mounted; a frame unit supporting the connection unit and configured to be movable; a drive unit configured to move the frame unit; and a control unit to which a plurality of different driving modes corresponding to at least some of the plurality of task modules is input in advance and which controls the drive unit so that the moving robot is autonomously driven based on the plurality of driving modes.

17 Claims, 9 Drawing Sheets

MOVING ROBOT AND MOVING ROBOT ASSEMBLY INCLUDING THE SAME

CROSS-REFERENCE TO RELATED APPLICATION(S)

This application claims the benefit of priority to Korean Patent Application No. 10-2022-0023162 filed on Feb. 22, 2022 in the Korean Intellectual Property Office, the disclosure of which is incorporated herein by reference in its entirety.

TECHNICAL FIELD

The present disclosure relates to a moving robot and a moving robot assembly including the same.

BACKGROUND

In general, a moving robot is a device that automatically performs a predetermined operation while traveling on its own in a predetermined area without a user's manipulation. The moving robot is equipped with an autonomous technology to freely move within a predetermined area, and for this purpose, includes a sensor, a battery, a controller, or the like.

The moving robot may perform a cleaning operation, a lawn mowing operation, or a patrol operation as needed while traveling in a predetermined area. In addition, in order for the moving robot to perform not only the autonomy function but also other operations, equipment and sensors necessary for the operation should be provided. For example, when a moving robot performs a lawn mowing operation, a lawn mower and a sensor for assisting the lawn mower are required.

Meanwhile, since the conventional moving robot performs only one function, the moving robot has not been utilized when other functions are required. For example, a moving robot capable of only mowing a lawn cannot be used in a space where a cleaning robot is needed, and in this case, the necessity and usefulness of the moving robot are reduced. Accordingly, in recent years, a moving robot capable of performing a plurality of operations has been developed in order to improve usability of the moving robot.

However, when the moving robot performs a plurality of motions, the number of devices and sensors for performing the plurality of motions increases, and as a result, the robot is complicated and the volume and weight of the robot increase. In addition, in order for the moving robot to perform a plurality of operations, a high-performance arithmetic processing device is required, and a high cost is required for the arithmetic processing device for controlling the moving robot.

Therefore, there is a need for a moving robot having high usability by performing a plurality of functions while reducing manufacturing cost and minimizing the volume and weight of the moving robot.

SUMMARY

One embodiment of the present disclosure is made in view of the above background, and an object of the present disclosure is to provide a moving robot in which a module for performing a predetermined function is installed in a replaceable manner to increase usability.

In addition, one embodiment of the present disclosure is to provide a moving robot which has a minimum volume and weight, performs various functions while autonomously driving, and has a reduced manufacturing costs.

In accordance with a first embodiment of the present disclosure, there is provided a moving robot including: a connection unit configured to detachably mount one of a plurality of task modules and electrically connectable to the one of the plurality of task modules when the one of a plurality of task modules is mounted; a frame unit supporting the connection unit and configured to be movable; a drive unit configured to move the frame unit; and a control unit to which a plurality of different driving modes corresponding to at least some of the plurality of task modules is input in advance and which controls the drive unit so that the moving robot is autonomously driven based on the plurality of driving modes.

The connection unit may include: a connection body to which the one of the plurality of task modules is detachably mounted; and a plurality of robot terminals configured to be electrically connected to the plurality of task modules, wherein the control unit selects one of the plurality of driving modes based on which of the plurality of robot terminals is electrically connected to the one of the plurality of task modules, and controls the drive unit based on the selected driving mode.

The control unit may select one of the plurality of driving modes when one or more robot terminals of a first group among the plurality of robot terminals are connected to the one of the plurality of task modules, and select another driving mode among the plurality of driving modes when one or more robot terminals of a second group different from the first group among the plurality of robot terminals are connected to the one of the plurality of task modules.

In the first group and the second group, the one or more robot terminals included in the first group may be different from the one or more robot terminals included in the second group, or the one or more robot terminals included in the first group may be the same as some of the one or more robot terminals included in the second group, or some of the one or more robot terminals included in the first group may be different from each of the one or more robot terminals included in the second group.

The connection body may be configured to support the one of the plurality of task modules, and the connection body may include a plurality of engagement recesses having different shapes and engaged with the one of the plurality of task modules so that a relative position of the one of the plurality of task modules with respect to the moving robot is maintained.

The connection body may extend in one direction to guide a movement of the one of the plurality of task modules, and the plurality of engagement recesses may be spaced apart from each other along the one direction on the connection body.

The connection body may have a rail shape along which the one of the plurality of mission modules is slidable.

The connection unit may include a plurality of connection bodies configured to support the one of the plurality of task modules and extending in a length direction of the frame unit, and the plurality of connection bodies may be supported by the frame unit and are spaced apart in a width direction of the frame unit.

In accordance with a second embodiment of the present disclosure, there is provided a moving robot assembly including: a moving robot that is autonomously movable; and a plurality of task modules configured to be mounted on the moving robot, wherein the moving robot includes: a connection unit configured to detachably mount one of the plurality of task modules and electrically connectable to the one of the plurality of task modules when the one of a plurality of task modules is mounted; a frame unit supporting the connection unit and configured to be movable; a drive unit configured to move the frame unit; and a control unit to which a plurality of different driving modes corresponding to at least some of the plurality of task modules is input in advance and which controls the drive unit so that the moving robot is autonomously driven based on the plurality of driving modes.

The connection unit may include: a connection body to which one of the plurality of mission modules is detachably mounted; and a plurality of robot terminals configured to be electrically connected to the plurality of mission modules, wherein each of the plurality of mission modules may include a module terminal to be connected to one or more of the plurality of robot terminals, wherein when one of the plurality of mission modules is mounted on the connection body, the module terminal of the one of the plurality of mission modules may be connected to one or more robot terminals of a first group among the plurality of robot terminals, and wherein when another one of the plurality of mission modules is mounted on the connection body, the module terminal of the another one of the plurality of mission modules may be connected to one or more robot terminals of a second group different from the first group among the plurality of robot terminals.

The connection body may have an engagement recess, each of the plurality of mission modules may include a docking unit configured to be movable along the connection body, and the docking unit may have a fixture to be engaged with the engagement recess so that a relative position of each of the plurality of mission modules with respect to the moving robot is maintained.

The engagement recess may include a plurality of recesses, the plurality of engagement recesses may have different shapes, and the fixture may have a shape corresponding to one of the plurality of engagement recesses to engage with the one of the plurality of engagement recesses.

When another one of the plurality of mission modules different from the one of the plurality of mission modules is mounted on the connection body, a fixture of the another one of the plurality of mission modules may be engaged with another one of the plurality of engagement recesses.

The connection unit may be configured such that when one of the plurality of engagement recesses is engaged with the fixture, one or more robot terminals among the plurality of robot terminals are connected to the module terminal.

The connection body may extends in one direction to guide a movement of the one of the plurality of mission modules, and the plurality of engagement recesses may be spaced apart from each other along the one direction on the connection body.

The connection body may have a rail shape along which the docking unit is slidable.

The connection unit may include a plurality of connection bodies configured to support the one of the plurality of mission modules and extending in a length direction of the frame unit, and the plurality of connection bodies may be supported by the frame unit and are spaced apart in a width direction of the frame unit.

The connection unit may include: a connection body to which one of the plurality of mission modules is detachably mounted; a plurality of robot terminals configured to be electrically connected to the plurality of mission modules; and a power terminal disposed in the connection body at a position different from the plurality of robot terminals, and wherein each of the mission module may further include a battery unit for supplying power to the drive unit through the power terminal.

The control unit may be configured to control the drive unit so that the frame unit moves at different moving speeds along different moving paths for the plurality of driving modes, respectively.

The moving robot may further include: a sensing unit configured to sense a person or object around the moving robot; and an alarm unit configured to generate a warning sound or display letters, wherein the plurality of driving modes may include a patrol mode, and wherein the control unit may control the alarm unit based on information about the person or object detected by the sensing unit while the moving robot moves within a predetermined area when the moving robot is in the patrol mode.

One embodiment of the present disclosure has the effect of increasing usability of the moving robot by mounting a module for performing a predetermined function in a replaceable manner.

In addition, one embodiment of the present disclosure has an effect of minimizing the volume and weight of the robot and reducing manufacturing cost while performing various functions during autonomous driving.

DETAILED DESCRIPTION

Figure 1:
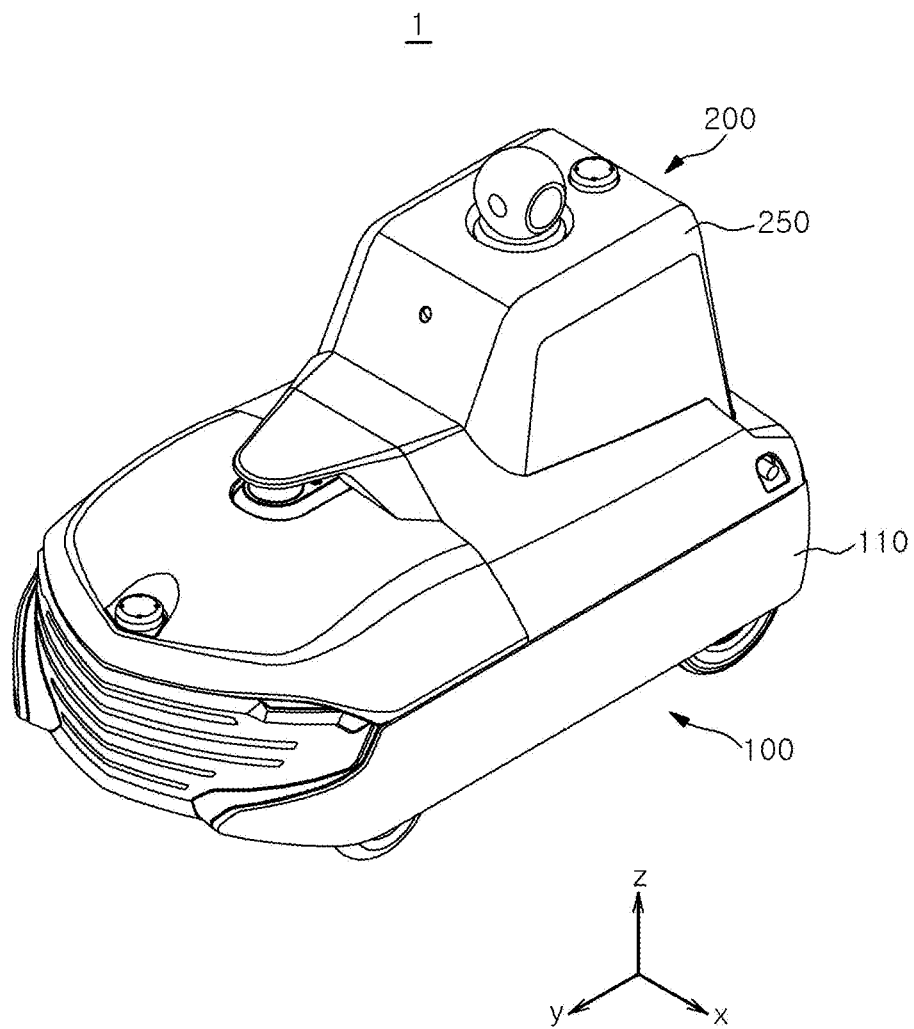
FIG. 1 is a perspective view illustrating a moving robot assembly according to one embodiment of the present disclosure.

In the present specification, an expression of a direction is described based on the drawing, and it is made clear in advance that it may be expressed differently when a direction of an object is changed. Meanwhile, a width direction of the present specification may be an x-axis direction illustrated in FIGS. 1, 2 and 4, and a length direction may be a y-axis direction illustrated in FIGS. 1, 2 and 4.

Hereinafter, a specific configuration of a moving robot assembly 1 according to one embodiment of the present disclosure will be described with reference to the drawings.

Figure 2:
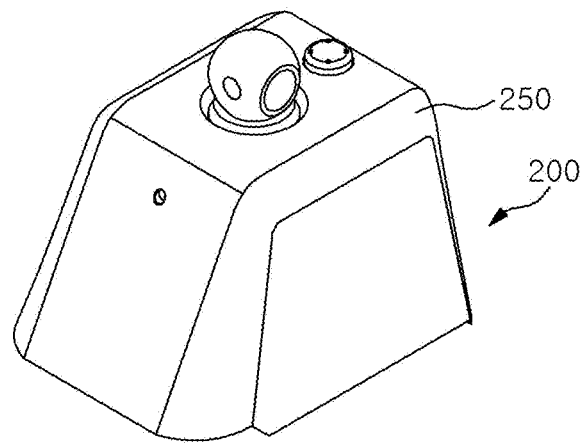
FIG. 2 is an exploded perspective view of the moving robot assembly of FIG. 1.
Figure 2:
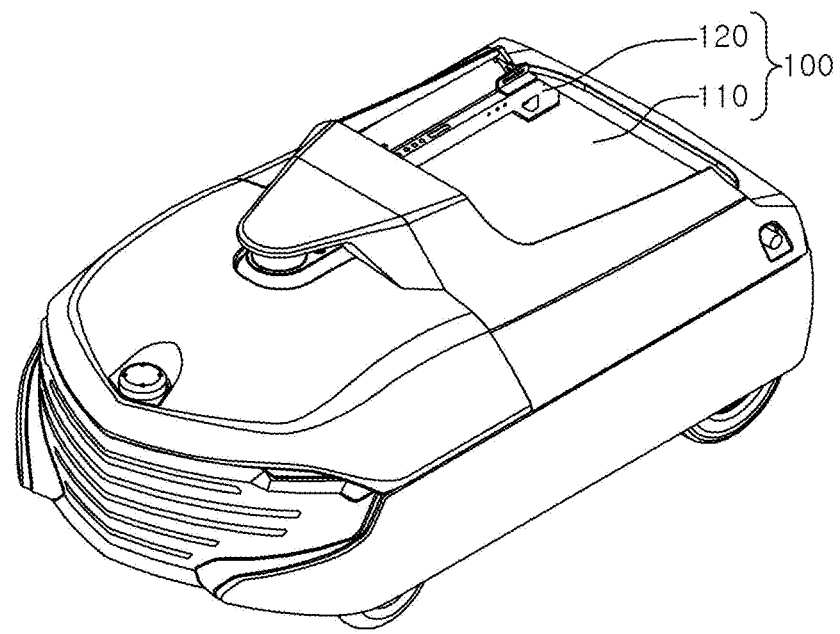

Hereinafter, referring to FIGS. 1 and 2, the moving robot assembly 1 according to one embodiment of the present disclosure is equipped with autonomous driving technology and can freely move within a predetermined area. Here, the autonomous driving means a technology for driving by itself without user's manipulation, and a moving robot capable of autonomous driving means a robot that can move by itself with minimal manipulation. For example, the autonomous driving may include a technology for automatically driving along a set route, a technology for driving by automatically setting a route when a destination is set, and a technology for automatically adjusting speed, such as adaptive cruise control.

In addition, the moving robot assembly 1 may perform a function corresponding to a specific mode while moving in a predetermined area through autonomous driving. For example, the moving robot assembly 1 may perform a patrol function of patrolling a predetermined area, a cleaning function of cleaning a predetermined area, a delivery function of delivering goods from one point to another, or a quarantine function of disinfecting a predetermined area. This moving robot assembly 1 may include a moving robot 100 and a task module 200.

Figure 3:
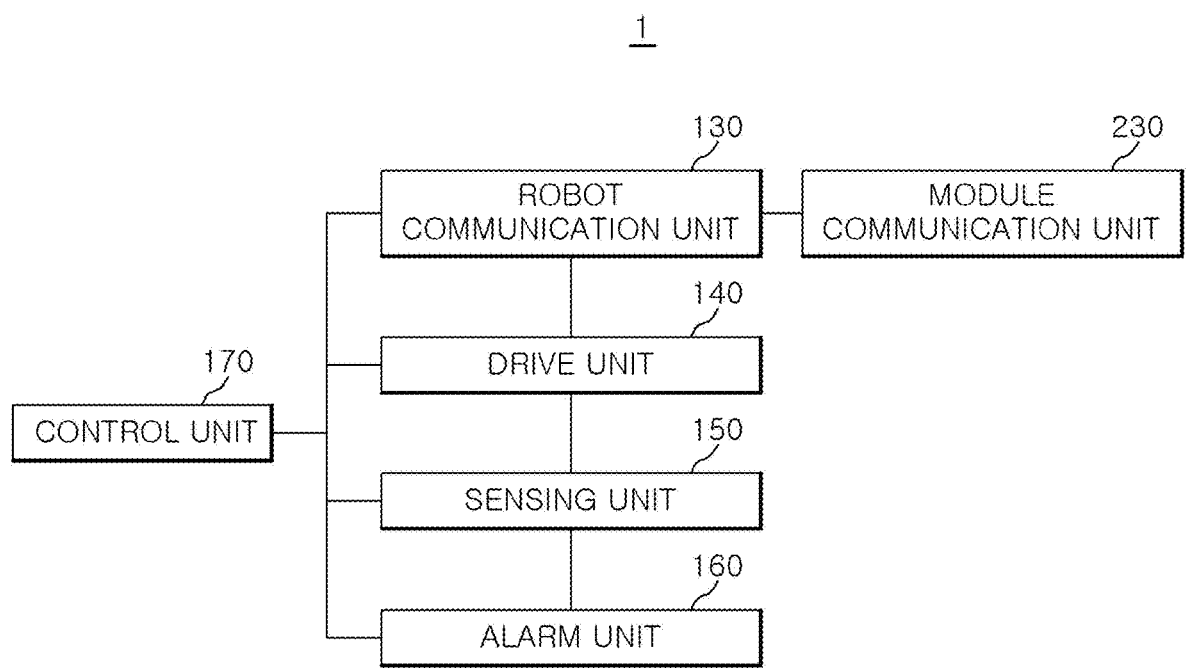
FIG. 3 is a block diagram conceptually illustrating some components of the moving robot assembly of FIG. 1.
Figure 4:
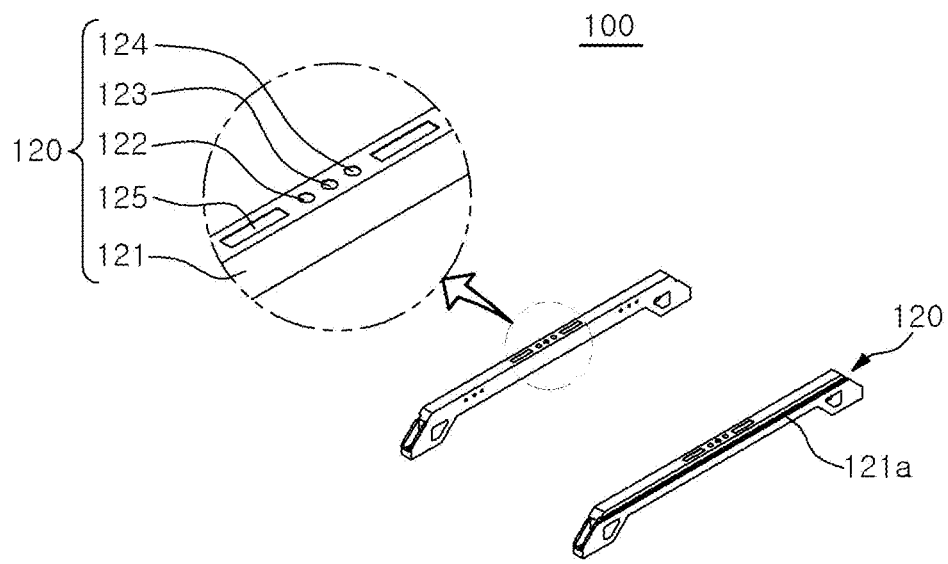
FIG. 4 is an exploded perspective view and a partially enlarged view of a moving robot illustrated in FIG. 2.
Figure 4:
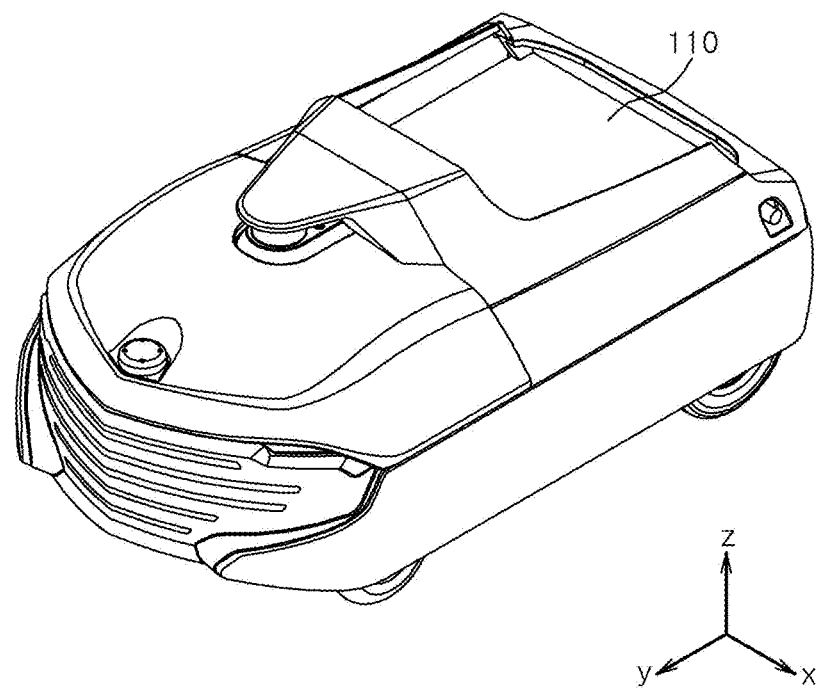

Referring to FIGS. 3 and 4, the moving robot 100 is a robot capable of performing autonomous driving and can freely move in a predetermined area. The moving robot 100 may be separated from the task module 200, and any one of a plurality of different task modules 200 may be selectively mounted on the moving robot 100. In addition, a moving speed and a moving path of the moving robot 100 may be determined according to the mounted task module 200. The moving robot 100 may include a frame unit 110, a connection unit 120, a robot communication unit 130, a drive unit 140, a sensing unit 150, an alarm unit 160, and a control unit 170.

The frame unit 110 may move within the small area and support the connection unit 120 and the task module 200. For example, a plurality of rotatable wheels may be provided to the frame unit 110 so that the frame unit 110 is movable. The wheels of the frame unit 110 may be driven by the drive unit 140. Moreover, the frame unit 110 may have a predetermined length and width. In the present specification, a width direction of the frame unit 110 may be the x-axis direction of FIG. 1, and a length direction of the frame unit 110 may be the y-axis direction of FIG. 1.

Figure 5:
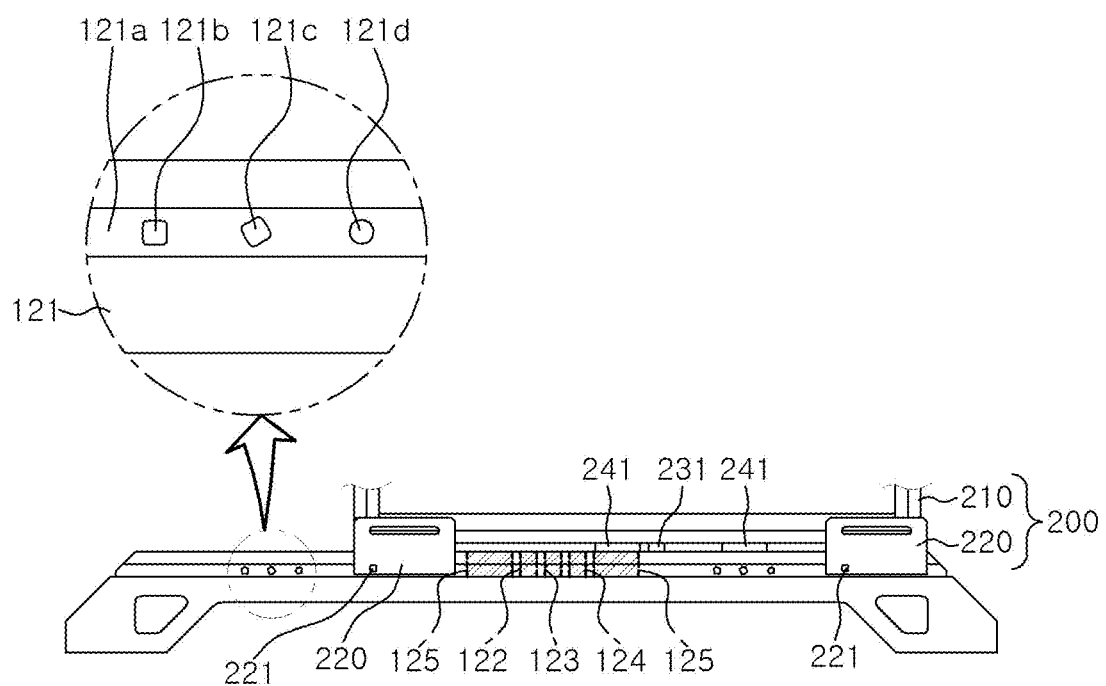
FIG. 5 is a view illustrating a state in which a task module is mounted on the moving robot of FIG. 2.

Referring to FIGS. 4 and 5, the connection unit 120 may be supported by the frame unit 110 and may support the task module 200. In addition, the task module 200 may be detachably mounted on the connection unit 120. For example, when the task module 200 is mounted on the moving robot 100, a docking unit 220 to be described below of the task module 200 is mounted on the connection unit 120. In addition, when separating the task module 200 from the moving robot 100, the docking unit 220 is separated from the connection unit 120. The connection unit 120 may be electrically connected to the task module 200 so that the robot communication unit 130 and the module communication unit 230 to be described later communicate with each other. For example, when the task module 200 is mounted on the connection unit 120, the robot communication unit 130 may transmit and receive signals with the task module 200 through the connection unit 120. The connection unit 120 may include a connection body 121, a plurality of robot terminals 122, 123, and 124, and a power terminal 125.

The connection body 121 is supported on the frame unit 110, and the task module 200 can be detachably mounted on the connection body 121. In addition, the connection body 121 may guide the movement of the task module 200 when the task module 200 is mounted on or separated from the moving robot 100, and may extend in one direction. For example, the connection body 121 may have a rail shape so that the task module 200 can slide, and may extend in the length direction of the frame unit 110. In addition, a plurality of connection bodies 121 may be provided, and the plurality of connection bodies 121 may be spaced apart from each other in the width direction of the frame unit 110. The connection body 121 may have a rail groove 121a and a plurality of engagement recesses 121b, 121c, and 121d.

The rail groove 121a is formed on an upper portion of the connection body 121 and may extend along one direction. For example, the rail groove 121a may be fitted into the connection body 121. In addition, the task module 200 may slide along the connection body 121 through the rail groove 121a.

The plurality of engagement recesses 121b, 121c, and 121d may be engaged with a fixture 221 of the task module 200 to be described later. For example, the plurality of engagement recesses 121b, 121c, and 121d may be holes formed through the rail groove 121a. In addition, a plurality of engagement recesses 121b, 121c, and 121d may be placed on the connection body 121 and may be provided to the connection body 121 to be spaced apart from each other along an extension direction of the connection body 121. The plurality of engagement recesses 121b, 121c, and 121d may include a first engagement recess 121b, a second engagement recess 121c, and a third engagement recess 121d.

The first engagement recess 121b, the second engagement recess 121c, and the third engagement recess 121d may have different shapes to engage with fixtures 221 of different shapes provided in different task modules 200. For example, the first engagement recess 121b may have a square shape, the second engagement recess 121c may have a rhombus shape, and the third engagement recess 121d may have a circular shape. In this case, the fixture 221 of the task module 200 may be engaged with and fixed to any one of the first engagement recess 121b, the second engagement recess 121c, and the third engagement recess 121d.

A plurality of robot terminals 122, 123, and 124 may be connected to a module terminal 231 to be described later of the task module 200. Here, the connection between the robot terminals 122, 123, and 124 and the module terminal 231 may include a physical connection and an electrical connection. For example, when the task module 200 is mounted on the moving robot 100, any one of the plurality of robot terminals 122, 123, and 124 may be electrically connected to the module terminal 231. In this case, the robot communication unit 130 and the module communication unit 230 may communicate with each other by the connection between the robot terminals 122, 123, and 124 and the module terminal 231. The plurality of robot terminals 122, 123, and 124 may include a first robot terminal 122, a second robot terminal 123, and a third robot terminal 124.

The first robot terminal 122, the second robot terminal 123, and the third robot terminal 124 may form a plurality of groups, and the plurality of groups may include a first group and a second group.

For example, the first group and the second group may be configured such that a robot terminal included in the first group is different from a robot terminal included in the second group. In this case, the first group may include the first robot terminal 122, the second group may include the second robot terminal 123, or the first group may include the first robot terminal 122 and the second robot terminal 123, and the second group may include the third robot terminal 124.

As another example, the first group and the second group may be configured such that the robot terminal included in the first group is the same as some of the robot terminals included in the second group. In this case, the first group may include the first robot terminal 122, and the second group may include the first robot terminal 122 and the second robot terminal 123. In addition, the first group may include the first robot terminal 122 and the second robot terminal 123, and the second group may include the first robot terminal 122, the second robot terminal 123, and the third robot terminal 124.

As another example, the first group and the second group may be configured so that some of the robot terminals included in the first group are different from each of the robot terminals included in the second group. In this case, the first group may include the first robot terminal 122 and the second robot terminal 123, and the second group may include the second robot terminal 123 and the third robot terminal 124.

The first group and the second group constituted by the first robot terminal 122, the second robot terminal 123, and the third robot terminal 124 may not be the same as each other. In other words, at least some of the robot terminals included in the first group and the robot terminals included in the second group may be different from each other. Moreover, the first group and the second group may be connected to the module terminals 231 of different task modules 200. The first robot terminal 122, the second robot terminal 123, and the third robot terminal 124 may be provided at different positions and may be disposed on the connection body 121 to be spaced apart from each other.

The power terminal 125 may be connected to a battery unit 240 to be described later of the task module 200 when the task module 200 is mounted on the moving robot 100. Here, the connecting the power terminal 125 to the battery unit 240 may include a physical connection and an electrical connection. The power terminal 125 may receive power from the battery unit 240, and the drive unit 140 may be driven by the power received through the power terminal 125. Meanwhile, the power terminal 125 is described as being connected to the task module 200, but this is only an example, and may receive power wirelessly from the battery unit 240. The power terminal 125 may be disposed on the connection body 121 at a different location from the plurality of robot terminals 122, 123, and 124.

Meanwhile, in the drawing according to the present embodiment, the plurality of robot terminals 122, 123, and 124 and the power terminal 125 are all illustrated as being disposed in the connection body 121, but the spirit of the present disclosure is not limited thereto. That is, at least some of the robot terminals 122, 123, and 124 and the power terminal 125 may be disposed in other components of the moving robot 100, such as the frame unit 110.

The robot communication unit 130 may communicate with the module communication unit 230 when the task module 200 is mounted on the moving robot 100. In other words, the robot communication unit 130 may transmit and receive data and information with the module communication unit 230 of the task module 200. In this case, the robot communication unit 130 may transmit data and information to the control unit 170. The robot communication unit 130 may be connected to one of wired, wireless, and satellite communication methods to transmit and receive data and information.

Meanwhile, in the present specification, the robot communication unit 130 and the module communication unit 230 have been described as communicating by connection between the robot terminals 122, 123, 124 and the module terminal 231, but this is only an example. That is, the robot communication unit 130 and the module communication unit 230 may communicate by other methods. For example, the robot communication unit 130 may communicate with the module communication unit 230 using at least one of communication technologies such as Wireless LAN (WLAN), Wireless Personal Area Network (WPAN), Wireless-Fidelity (Wi-Fi), Wireless Fidelity (Wi-Fi) Direct, Digital Living Network Alliance (DLNA), Wireless Broadband (WiBro), World Interoperability for Microwave Access (WiMAX), Zigbee, Z-wave, Blue-Tooth, Radio Frequency Identification (RFID), Infrared Data Association (IrDA), Ultrawide-Band (UWB), and Wireless Universal Serial Bus (USB).

In addition, the robot communication unit 130 may communicate with a server (not illustrated), receive information about a moving path from the server, and transmit information collected by the sensing unit 150 to the server.

The drive unit 140 may provide power for moving the frame unit 110. For example, the drive unit 140 may include an actuator and a hydraulic cylinder. Moreover, the drive unit 140 may drive the frame unit 110 so that the frame unit 110 moves. Here, the meaning of driving the frame unit 110 by the drive unit 140 may include not only rotating the wheels provided in the frame unit 110 but also steering the wheels. In other words, the drive unit 140 may rotate the wheels of the frame unit 110, and may adjust the moving direction of the frame unit 110 by changing axial directions of the wheels of the frame unit 110. In this case, the moving speed and movement direction of the frame unit 110 may be determined by the drive unit 140. The drive unit 140 may be controlled by the control unit 170.

The sensing unit 150 may sense an environment around the moving robot 100 and may sense people or objects around the moving robot 100. For example, the sensing unit 150 may detect obstacles encountered while driving. The sensing unit 150 may include, e.g., a camera, radar, a lidar sensor, an infrared ray sensor, an ultrasonic sensor, a radio frequency sensor (RF sensor), and a position sensitive detector (PSD) sensor.

As another example, the sensing unit 150 may sense, e.g., the position, speed and direction of the moving robot 100. The sensing unit 150 may include an Inertial Measurement Unit (IMU), a 3D position sensor (GPS, Global Positioning System), a gyro sensor, a tilt sensor, and the like.

As another example, the sensing unit 150 may acquire image information from around the moving robot 100. The sensing unit 150 may include a lidar sensor, an optical flow sensor, a 2D camera sensor, a 3D camera sensor, and the like.

The sensing unit 150 may collect information around the moving robot 100 through a plurality of sensors, or the like, and the collected information may be used for autonomous driving of the moving robot 100 or for performing functions of the moving robot 100. Here, the information collected by the sensing unit 150 may include information about people or objects around the moving robot 100.

The alarm unit 160 may generate an alarm when a specific signal is transmitted. For example, the alarm unit 160 may include a speaker (not illustrated) and generate a warning sound through the speaker. As another example, the alarm unit 160 includes a display (not illustrated), and may display a warning message or an alarm through the display. The alarm unit 160 may be controlled by the control unit 170.

The control unit 170 may control the robot communication unit 130, the drive unit 140, the sensing unit 150, and the alarm unit 160. The control unit 170 may select any one of a plurality of driving modes based on which robot terminal 122, 123, 124 among the plurality of robot terminals 122, 123, 124 is electrically connected to the task module 200. In other words, when the task module 200 is mounted on the connection unit 120, the control unit 170 may control the drive unit 140 to perform the driving mode function corresponding to the robot terminals 122, 123, and 124 to which the mounted task module 200 is connected. For example, the control unit 170 may select different driving modes when the robot terminal of the first group is connected to the task module 200 and when the robot terminal of the second group is connected to the task module 200. As a more detailed example, the control unit 170 controls the drive unit 140 based on a first driving mode when the robot terminal of the first group is electrically connected to the first task module 201, and then, when the first task module 201 is changed to the second task module 202 and the robot terminal of the second group is connected to the second task module 202, the control unit 170 may control the drive unit 140 by changing the driving mode from the first driving mode to the second driving mode.

The control unit 400 may be implemented by an arithmetic device such as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), a processor, a microprocessor, a controller, or a microcontroller, a measuring device such as a sensor, and a memory such as a read only memory (ROM) and a random access memory (RAM), and since the implementation method thereof is obvious to those skilled in the art, further detailed description is omitted.

Meanwhile, the control unit 170 may be placed in a plurality of driving modes, and may select one driving mode from among the plurality of driving modes according to the mounted task module 200. In this case, the control unit 170 may control the drive unit 140 to perform a function according to the selected driving mode. For example, the plurality of driving modes may correspond to a group of the plurality of robot terminals 122, 123, and 124 on a one-to-one basis. The control unit 170 may select the driving mode by recognizing the robot terminals 122, 123, and 124 connected to the module terminal 231.

As a more detailed example, the plurality of driving modes may include a patrol mode corresponding to the first group including the first robot terminal 122, a quarantine mode corresponding to the second group including the second robot terminal 123, and a delivery mode corresponding to the third group including the robot terminal 124. When the module terminal 231 of the task module 200 is connected to the first robot terminal 122, the control unit 170 may recognize the connection between the module terminal 231 and the first robot terminal 122 and control the control unit 140 to perform the function of the patrol mode. In this case, the control unit 170 may control the alarm unit 160 so that the alarm unit 160 generates a warning sound based on the person or object information detected by the sensing unit 150 while the moving robot 100 moves within a predetermined area. Meanwhile, the control unit 170 may control the drive unit 140 to perform the function of the quarantine mode when the task module 200 is replaced and the connection between the second robot terminal 123 and the module terminal 231 is recognized.

In the present specification, the plurality of driving modes performed by the moving robot 100 are described as the patrol mode, the quarantine mode, and the delivery mode, but these are only examples and the present disclosure is not limited thereto. Accordingly, the plurality of driving modes performed by the moving robot 100 may include several modes such as a cleaning mode and a guide mode.

Figure 6:
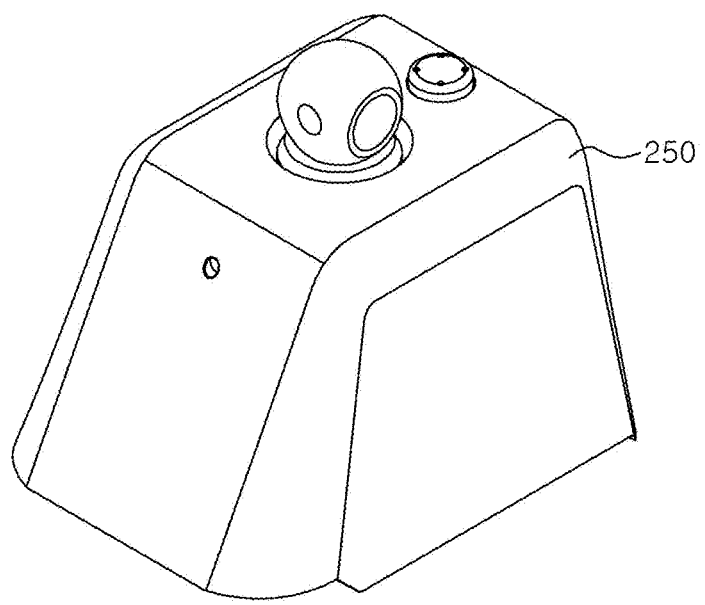
FIG. 6 is an exploded perspective view of the task module illustrated in FIG. 2.
Figure 6:
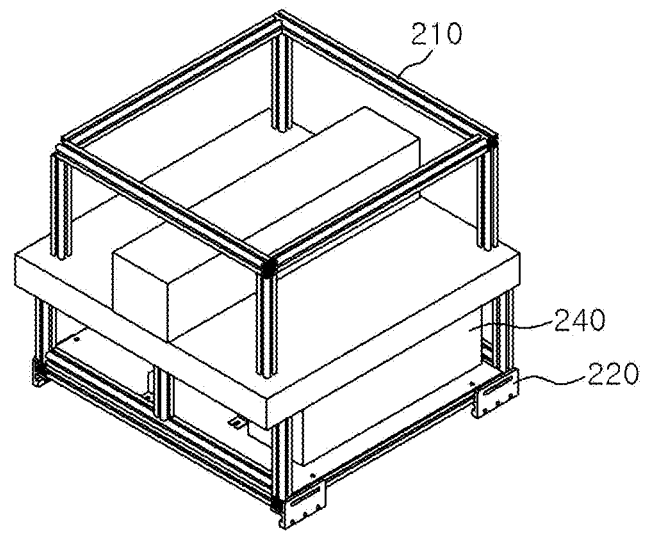

Referring to FIG. 6, the task module 200 may be detachably mounted on the moving robot 100. When the task module 200 is mounted on the moving robot 100, the task module 200 can communicate with the moving robot 100 and supply power to the moving robot 100. In addition, the task module 200 may be replaced with different task modules 200 so that the moving robot 100 performs functions of different modes. For example, the task module 200 may be replaced with different task modules 200 such as a first task module 201 as a patrol task module, a second task module 202 as a quarantine task module, and a third task module 203 as a delivery task module. When the patrol task module 201 is mounted on the moving robot 100, the moving robot 100 performs the function of the first driving mode which is the patrol mode. In addition, when the patrol task module 201 is replaced with the quarantine task module 202, the moving robot 100 performs the function of the second driving mode which is the quarantine mode, and when the task module is replaced with the delivery task module 203, the moving robot 100 performs the function of the third driving mode which is the delivery mode.

In the present specification, the task module 200 has been described as the patrol task module 201, the quarantine task module 202, and the delivery task module 203, but these are only examples and the present disclosure is not limited thereto. Therefore, the task module 200 may be replaced with another task module 200 such as a cleaning task module 200, a guidance task module 200, a firefighting task module 200, a medical task module 200, an agricultural task module 200, and a construction task module 200.

Meanwhile, the task module 200 may include a module body 210, the docking unit 220, the module communication unit 230, the battery unit 240, and a housing 250.

The module body 210 may support the docking unit 220, the module communication unit 230, the battery unit 240, and the housing 250. The module body 210 may be supported by the moving robot 100 through the docking unit 220.

The docking unit 220 may be mounted on the connection unit 120 when the task module 200 is mounted on the moving robot 100. In addition, the docking unit 220 may be configured to slide along the rail of the connection unit 120. A plurality of docking units 220 are provided, and the plurality of docking units 220 may be supported by the module body 210 to be spaced apart along the width direction of the frame unit 110. In addition, each of the plurality of docking units 220 may be supported by the plurality of connection bodies 121.

Figure 7:
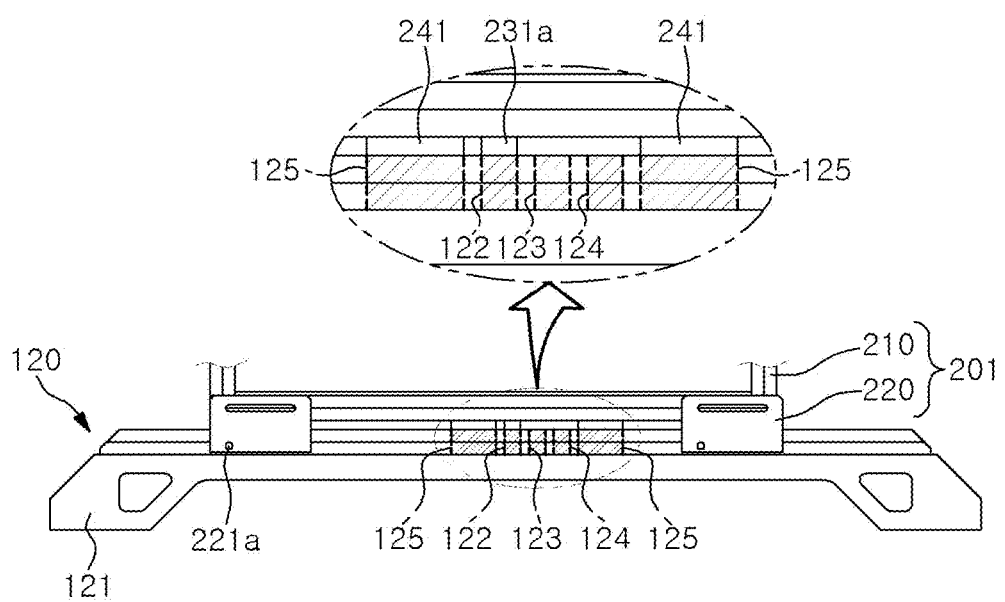
FIG. 7 is a view illustrating a state in which the task module of FIG. 5 is engaged with a first engagement recess.
Figure 8:
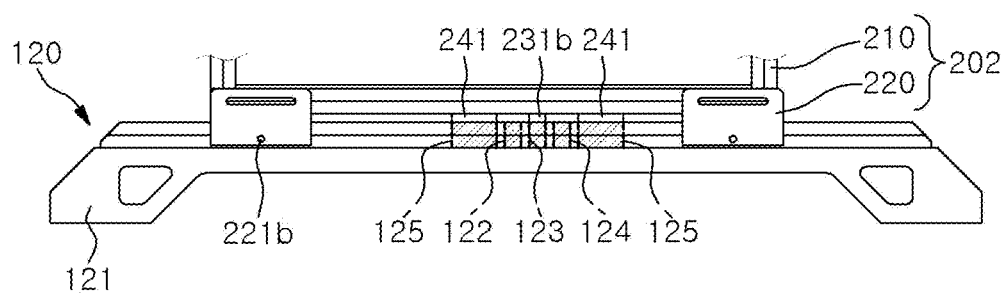
FIG. 8 is a view illustrating a state in which the task module of FIG. 5 is engaged with a second engagement recess.
Figure 9:
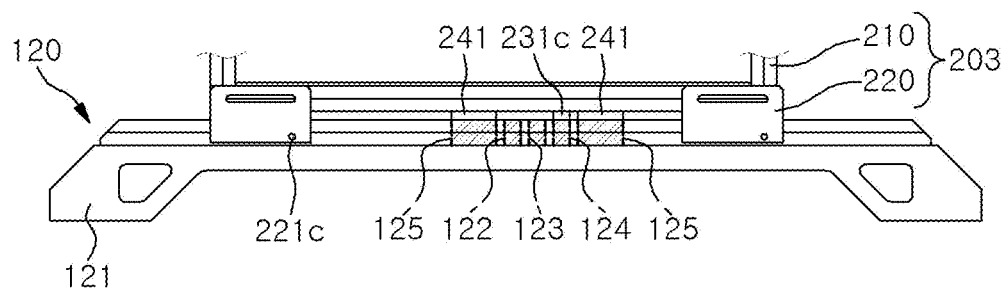
FIG. 9 is a view illustrating a state in which the task module of FIG. 5 is engaged with a third engagement recess.

Meanwhile, referring to FIGS. 7 to 9, the docking unit 220 may have a fixture 221 that can be engaged with the engagement recesses 121b, 121c, and 121d. The fixture 221 may be engaged with any one of the plurality of engagement recesses 121b, 121c, and 121d so that the relative position of the task module 200 with respect to the moving robot 100 is maintained. The fixtures 221 may have different shapes depending on the type of task module 200. In addition, the fixture 221 may have a shape corresponding to any one of the first engagement recess 121b, the second engagement recess 121c, and the third engagement recess 121d having different shapes.

For example, the first fixture 221a provided in the patrol task module 201 may be engaged with the first engagement recess 121b and may have a square shape. In addition, the second fixture 221b provided in the quarantine task module 202 may be engaged with the second engagement recess 121c and may have a diamond shape. In addition, the third fixture 221c provided in the delivery task module 203 may be engaged with the third engagement recess 121d and may have a circular shape.

Moreover, the position of the fixture 221 relative to the module body 210 may be different depending on the task module 200. For example, the relative positions of the first fixture 221a, the second fixture 221b, and the third fixture 221c with respect to the module body 210 may be different from each other. In this case, even when different task modules 200 are mounted on the moving robot 100, the relative position of the task module 200 to the moving robot 100 may be constant. In other words, even when the fixtures 221 at different positions are engaged with the engagement recesses 121b, 121c, and 121d at different positions, the relative position between the moving robot 100 and the task module 200 may be constant. The module communication unit 230 may communicate with the robot communication unit 130 when the task module 200 is mounted on the moving robot 100. In other words, the module communication unit 230 may transmit and receive data and information with the robot communication unit 130 of the moving robot 100. The module terminal 231 may be provided in the module communication unit 230, and the module communication unit 230 may be connected to the robot communication unit 130 through the module terminal 231.

Referring FIGS. 7 to 9, the module terminal 231 may be connected to the robot terminals 122, 123, and 124 when the task module 200 is mounted on the moving robot 100. When the module terminal 231 and the robot terminals 122, 123, and 124 are connected to each other, the task module 200 and the moving robot 100 may transmit and receive data and information to each other.

The module terminal 231 may be connected to any one of a plurality of robot terminals 122, 123, and 124. In addition, the module terminal 231 may be connected to the plurality of different robot terminals 122, 123, and 124 according to the type of the task module 200. In other words, the module terminal 231 may be connected to robot terminals 122, 123, and 124 of different groups according to the type of the task module 200. For example, the first module terminal 231a provided in the first task module 201 may be connected to the first robot terminal 122, and the second module terminal 231b provided in the second task module 202 may be connected to the second robot terminal 123. In addition, the third module terminal 231c provided in the third task module 203 may be connected to the third robot terminal 124.

In addition, the module terminal 231 may include a plurality of terminals, and may be connected to a plurality of robot terminals 122, 123, and 124. For example, the first module terminal 231a provided to the first task module 201 may include two terminals and may be connected to the first robot terminal 122 and the second robot terminal 123. In addition, the second module terminal 231b provided in the second task module 202 may include three terminals, and may be connected to the first robot terminal 122, the second robot terminal 123, and the third robot terminal 124. As such, the module terminal 231 may be connected to robot terminals 122, 123, and 124 of different groups according to the task module 200.

Meanwhile, the module terminals 231 may have different positions relative to the module body 210 depending on the type of the task module 200. For example, the relative positions of the first module terminal 231a, the second module terminal 231b, and the third module terminal 231c with respect to the module body 210 may be different from each other. Even when different task modules 200 are mounted on the moving robot, the module terminal 231 may be connected to different robot terminals 122, 123, and 124. In other words, even when different types of task modules 200 are mounted on the moving robot 100, the module terminal 231 can be prevented from being connected to the same robot terminals 122, 123, and 124.

The battery unit 240 may supply power to the moving robot 100 when the task module 200 is mounted on the moving robot 100. For example, the battery unit 240 may be connected to the power terminal 125 when the task module 200 is mounted on the moving robot 100. In this case, the battery unit 240 may supply power to the drive unit 140 through a power terminal. The battery unit 240 may include a battery terminal 241 connected to the power terminal 125. The battery terminal 241 may transmit power to the drive unit 140 through the power terminal 125.

The housing 250 may accommodate the module body 210, the docking unit 220, the module communication unit 230, and the battery unit 240. The housing 250 may be supported by the frame unit 110 when the task module 200 is mounted on the moving robot 100.

Hereinafter, the operation and effects of the moving robot assembly 1 according to one embodiment of the present disclosure will be described.

Different types of task modules 200 may be mounted on the moving robot 100, and may be replaced with other task modules 200 as needed. When the task module 200 is mounted on the moving robot 100, the docking unit 220 may slide along the connection body 121. In addition, when the docking unit 220 reaches a predetermined position, the fixture 221 of the docking unit 220 may be engaged with the engagement recesses 121b, 121c, and 121d so that the relative position of the fixture 221 with respect to the moving robot 100 is maintained. In this case, the robot terminals 122, 123, and 124 of the connection unit 120 may be connected to the module terminal 231 of the task module 200.

When the task module 200 is mounted on the robot terminals 122, 123, and 124, the robot communication unit 130 may communicate with the module communication unit 230 through the robot terminals 122, 123, and 124 and the module terminal 231. In addition, the control unit 170 may select a driving mode among the plurality of driving modes corresponding to a robot terminal connected to the module terminal 231 among the plurality of robot terminals 122, 123, and 124. In this case, the control unit 170 may control the drive unit 140 to perform the function of the selected driving mode.

For example, when the patrol task module 201 is mounted on the moving robot 100, the first engagement recess 121b may be engaged with the first fixture 221a, and the first robot terminal 122 may be connected to the first module terminal 231a. In this case, the control unit 170 may recognize the connection between the first robot terminal 122 and the first module terminal 231a, select the patrol mode, and control the drive unit 140 to perform the function of the patrol mode. As a more detailed example, when the control unit 170 selects the patrol mode, the moving robot 100 may acquire image information through the camera of the sensing unit 150 while driving, and may detect abnormal situations such as fire and noise through the sensor of the sensing unit 150.

Meanwhile, when the patrol task module 201 is separated from the moving robot 100 and the quarantine task module 202 is mounted on the moving robot 100, the second engagement recess 121c is engaged with the second fixture 221b. In addition, the second robot terminal 123 may be connected to the second module terminal 231b. In this case, the control unit 170 may recognize the connection between the second robot terminal 123 and the second module terminal 231b, select the quarantine mode, and control the drive unit 140 to perform the function of the quarantine mode. As a more detailed example, when the control unit 170 selects the quarantine mode, it can sense a sterilization target area requiring sterilization through the sensing unit 150. In addition, the moving robot 100 may further include a sterilization module (not illustrated), and the control unit 170 may control the sterilization module to spray sterilization water to the area to be sterilized.

Meanwhile, when the quarantine task module 202 is separated from the moving robot 100 and the delivery task module 203 is mounted on the moving robot 100, the third engagement recess 121d is engaged with the third fixture 221c. In addition, the third robot terminal 124 may be connected to the third module terminal 231c. In this case, the control unit 170 may recognize the connection between the third robot terminal 124 and the third module terminal 231c, select the delivery mode, and control the drive unit 140 to perform the function of the delivery mode. As a more detailed example, when the control unit 170 selects the delivery mode, the robot communication unit 130 may receive delivery information from one or more of a server (not illustrated) and the module communication unit 230. In addition, the control unit 170 may control the drive unit 140 so that the moving robot 100 travels from a delivery start point to an arrival point based on the delivery information. In this case, the housing 250 may be configured to be opened and closed in order to mount the delivery product.

As such, in the moving robot assembly 1 according to one embodiment of the present disclosure, by configuring the moving robot 100 and the task module 200 to be separable, it is possible to perform the functions of the plurality of driving modes using one moving robot platform.

In addition, by changing the driving mode only by replacing the task module 200, it is possible to minimize the volume and weight of the moving robot 100 without mounting sensors and equipment for performing a plurality of functions on the moving robot 100. In this case, the manufacturing cost of the moving robot 100 is reduced.

Meanwhile, by configuring the shapes of the engagement recesses 121b, 121c, and 121d differently from each other, different types of task modules 200 can be mounted on the moving robot 100 at a constant position even when the task modules 200 are mounted. In addition, by configuring the positions of the plurality of robot terminals 122, 123, and 124 differently, even when the task module 200 is mounted at a constant position, the task module 200 can be connected to different module terminals 231. In this case, even when different types of task modules 200 are mounted on the moving robot 100, it is possible to prevent the control unit 170 from selecting a driving mode that does not correspond to the task module 200.

In addition, any one of the plurality of modes is selected only by recognizing the robot terminals 122, 123, 124 connected to the module terminal 231, and thus, it is possible to omit a separate algorithm and sensor for recognizing the type of task module 200.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A moving robot comprising:
   a connection unit configured to detachably mount one of a plurality of task modules and electrically connectable to the one of the plurality of task modules when the one of the plurality of task modules is mounted;
   a frame unit supporting the connection unit and configured to be movable;
   a drive unit configured to move the frame unit; and
   a control unit to which a plurality of different driving modes corresponding to at least some of the plurality of task modules is input in advance and which controls the drive unit so that the moving robot is autonomously driven based on the plurality of driving modes,
   wherein the connection unit includes a connection body to which the one of the plurality of task modules is detachably mounted,
   wherein the connection body is configured to support the one of the plurality of task modules,
   wherein the connection body includes a plurality of engagement recesses having different shapes and engaged with the one of the plurality of task modules so that a relative position of the one of the plurality of task modules with respect to the moving robot is maintained,
   wherein each of the plurality of task modules has a fixture to be engaged with each of the plurality of engagement recesses so that a relative position of the plurality of task modules with respect to the moving robot is maintained,
   wherein the fixture has a shape corresponding to one of the plurality of engagement recesses to engage with the one of the plurality of engagement recesses,
   wherein when another one of the plurality of task modules different from the one of the plurality of task modules is mounted on the connection body, the fixture of the another on of the plurality of task modules is engaged with another one of the plurality of engagement recesses.

2. The moving robot of claim 1, wherein the connection unit further includes:
   a plurality of robot terminals configured to be electrically connected to the plurality of task modules,
   wherein the control unit selects one of the plurality of driving modes based on which of the plurality of robot terminals is electrically connected to the one of the plurality of task modules, and controls the drive unit based on the selected driving mode.

3. The moving robot of claim 1, wherein the control unit selects one of the plurality of driving modes when one or more robot terminals of a first group among the plurality of robot terminals are connected to the one of the plurality of task modules, and selects another driving mode among the plurality of driving modes when one or more robot terminals of a second group different from the first group among the plurality of robot terminals are connected to the one of the plurality of task modules.

4. The moving robot of claim 3, wherein in the first group and the second group,
   the one or more robot terminals included in the first group are different from the one or more robot terminals included in the second group, or the one or more robot terminals included in the first group are the same as some of the one or more robot terminals included in the second group, or some of the one or more robot terminals included in the first group are different from each of the one or more robot terminals included in the second group.

5. The moving robot of claim 1, wherein the connection body extends in one direction to guide a movement of the one of the plurality of task modules, and the plurality of engagement recesses are spaced apart from each other along the one direction on the connection body.

6. The moving robot of claim 1, wherein the connection body has a rail shape along which the one of the plurality of task modules is slidable.

7. The moving robot of claim 1, wherein the connection unit includes a plurality of connection bodies configured to support the one of the plurality of task modules and extending in a length direction of the frame unit, and the plurality of connection bodies are supported by the frame unit and are spaced apart in a width direction of the frame unit.

8. A moving robot assembly comprising:
a moving robot that is autonomously movable; and
a plurality of task modules configured to be mounted on the moving robot,
wherein the moving robot includes:
a connection unit configured to detachably mount one of the plurality of task modules and electrically connectable to the one of the plurality of task modules when the one of the plurality of task modules is mounted;
a frame unit supporting the connection unit and configured to be movable;
a drive unit configured to move the frame unit; and
a control unit to which a plurality of different driving modes corresponding to at least some of the plurality of task modules is input in advance and which controls the drive unit so that the moving robot is autonomously driven based on the plurality of driving modes,
wherein the connection unit includes a connection body to which the one of the plurality of task module detachably mounted,
wherein the connection body is configured to support the one of the plurality of task modules,
wherein the connection body includes a plurality of engagement recesses having different shapes and engaged with the one of the plurality of task modules so that relative position of the one of the plurality of task modules with respect to the moving robot is maintained,
wherein each of plurality of task modules has a fixture to be engaged with each of the plurality of engagement recesses so that a relative position of each of the plurality of task modules with respect to the moving robot is maintained,
wherein the fixture has a shape corresponding to one of the plurality of engagement recesses to engage with the one of the plurality of engagement recesses,
wherein with another one of the plurality of task modules different from the one of the plurality of task modules is mounted on the connection body, the fixture of the anther one of the plurality of task modules is engaged with another one of the plurality of engagement recesses.

9. The moving robot assembly of claim 8, wherein the connection unit further includes:

a plurality of robot terminals configured to be electrically connected to the plurality of task modules, wherein each of the plurality of task modules includes a module terminal to be connected to one or more of the plurality of robot terminals, wherein when the one of the plurality of task modules is mounted on the connection body, the module terminal of the one of the plurality of task modules is connected to one or more robot terminals of a first group among the plurality of robot terminals, and wherein when the another one of the plurality of task modules is mounted on the connection body, the module terminal of the another one of the plurality of task modules is connected to one or more robot terminals of a second group different from the first group among the plurality of robot terminals.

10. The moving robot assembly of claim 9, wherein each of the plurality of task modules includes a docking unit configured to be movable along the connection body, and the docking unit has the fixture to be engaged with each of the plurality of engagement recesses so that a relative position of each of the plurality of task modules with respect to the moving robot is maintained.

11. The moving robot assembly of claim 8, wherein the connection unit is configured such that when one of the plurality of engagement recesses is engaged with the fixture, one or more robot terminals among the plurality of robot terminals are connected to the module terminal.

12. The moving robot assembly of claim 8, wherein the connection body extends in one direction to guide a movement of the one of the plurality of task modules, and the plurality of engagement recesses are spaced apart from each other along the one direction on the connection body.

13. The moving robot assembly of claim 10, wherein the connection body has a rail shape along which the docking unit is slidable.

14. The moving robot assembly of claim 8, wherein the connection unit includes a plurality of connection bodies configured to support the one of the plurality of task modules and extending in a length direction of the frame unit, and the plurality of connection bodies are supported by the frame unit and are spaced apart in a width direction of the frame unit.

15. The moving robot assembly of claim 8, wherein the connection unit includes:

a connection body to which one of the plurality of task modules is detachably mounted;

a plurality of robot terminals configured to be electrically connected to the plurality of task modules; and a power terminal disposed in the connection body at a position different from the plurality of robot terminals, and wherein each of the task modules further includes a battery unit for supplying power to the drive unit through the power terminal.

16. The moving robot assembly of claim 8, wherein the control unit is configured to control the drive unit so that the frame unit moves at different moving speeds along different moving paths for the plurality of driving modes, respectively.

17. The moving robot assembly of claim 8, wherein the moving robot further includes:

a sensing unit configured to sense a person or object around the moving robot; and an alarm unit configured to generate a warning sound or display letters, wherein the plurality of driving modes include a patrol mode, and wherein the control unit controls the alarm unit based on information about the person or object detected by the sensing unit while the moving robot moves within a predetermined area when the moving robot is in the patrol mode.

* * * * *